Jan. 2, 1968     T. E. CROLEY ET AL     3,361,326
FIBERBOARD BOX HAVING A STRENGTHENED CONNECTOR CORNER JOINT
Filed March 1, 1966     4 Sheets-Sheet 1
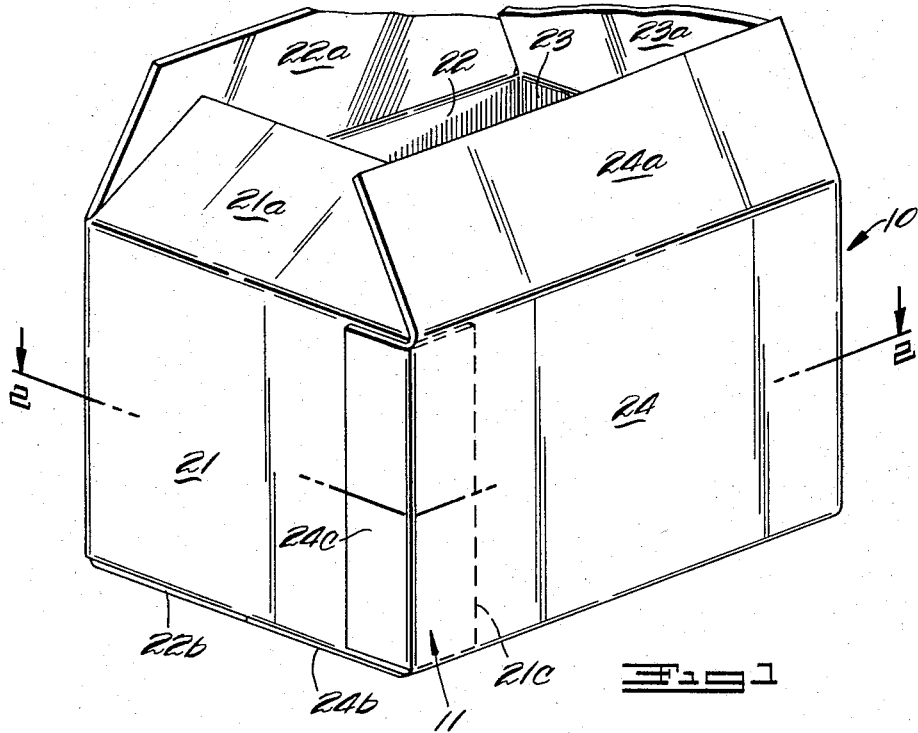
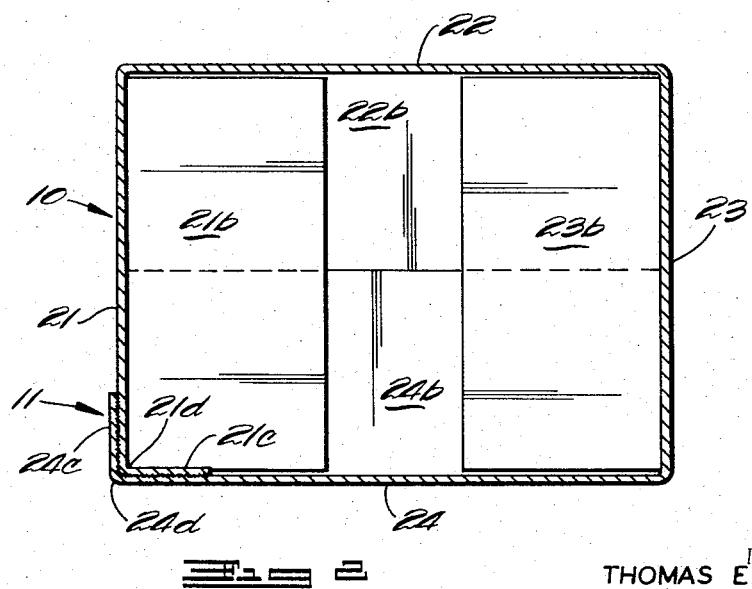
INVENTORS
THOMAS E. CROLEY
GALE R. SECKEL
BY MAHONEY, MILLER & RAMBO
BY Wm. V. Miller
ATTORNEYS

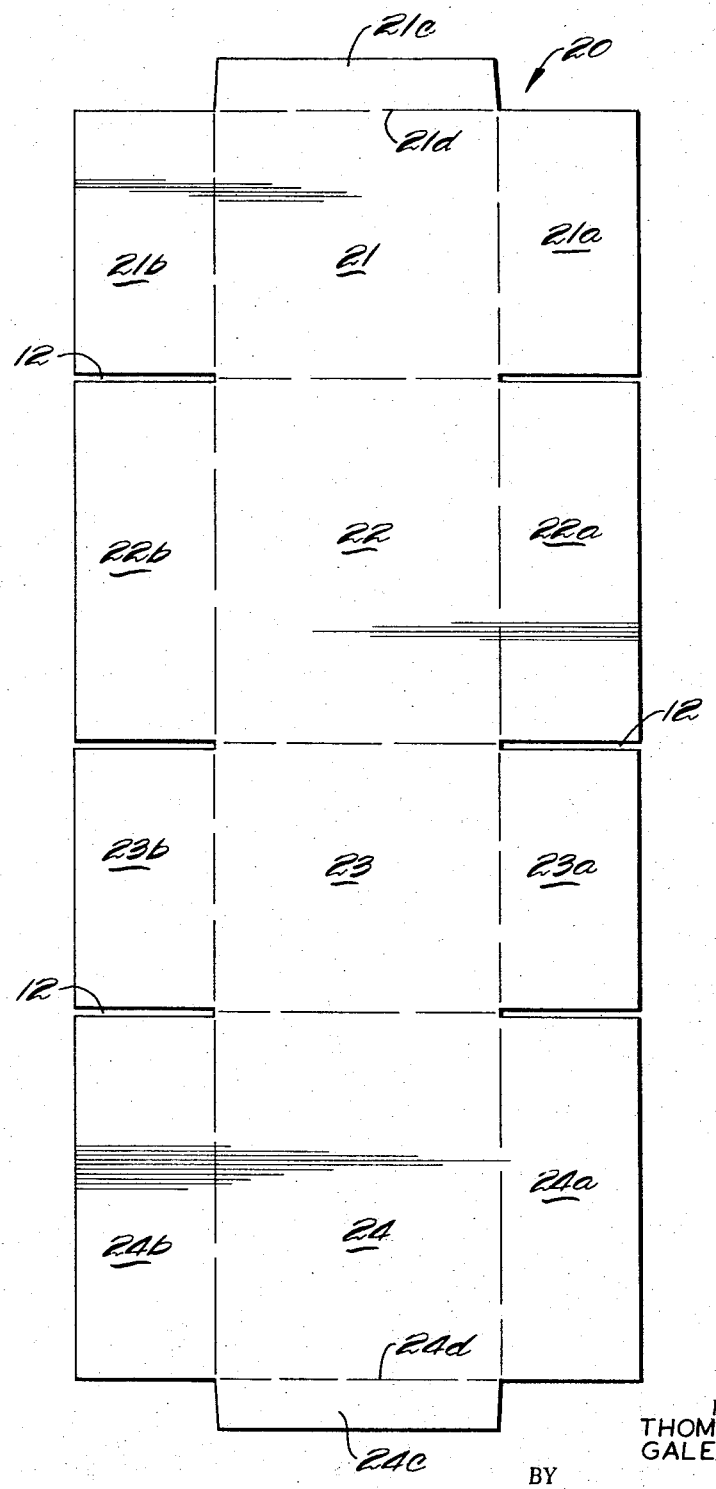

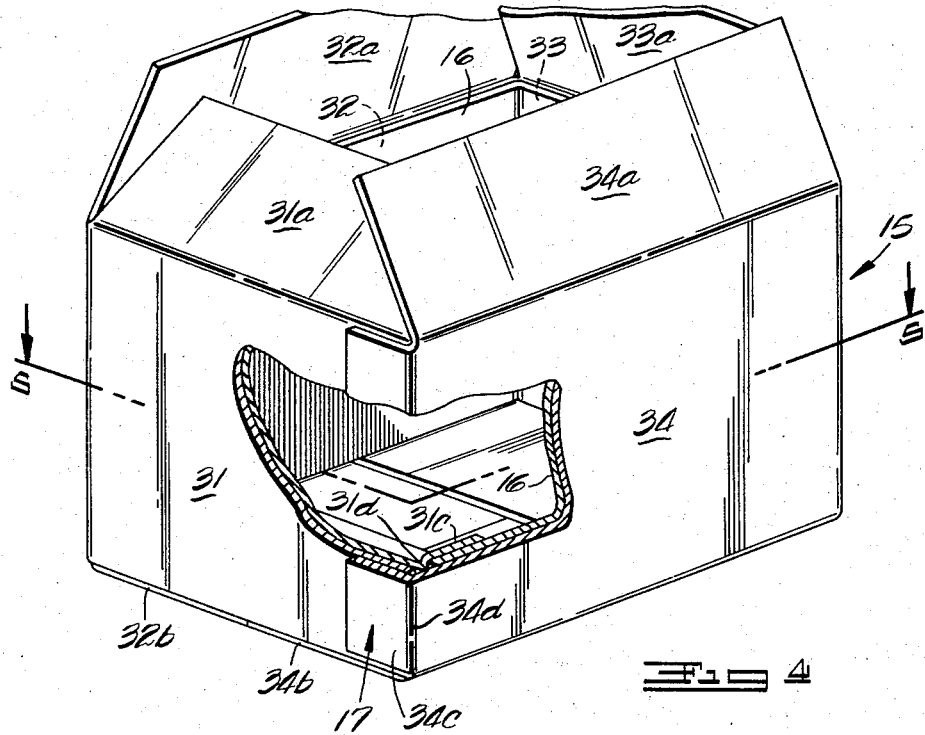
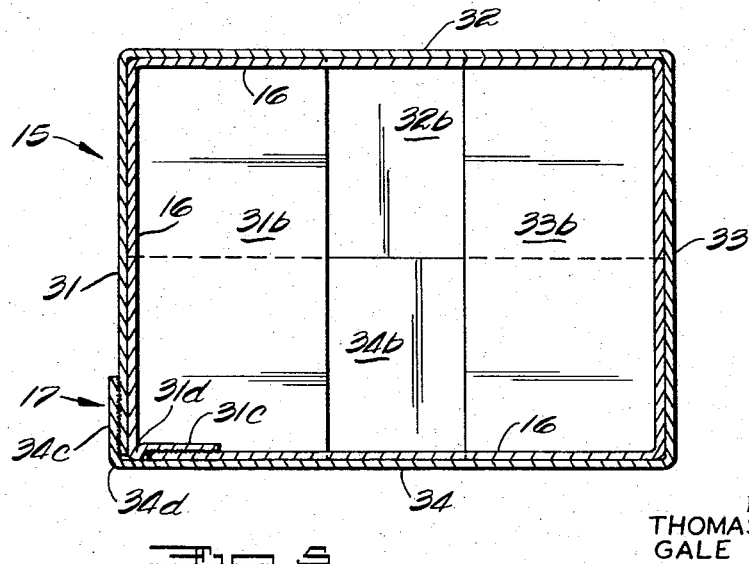

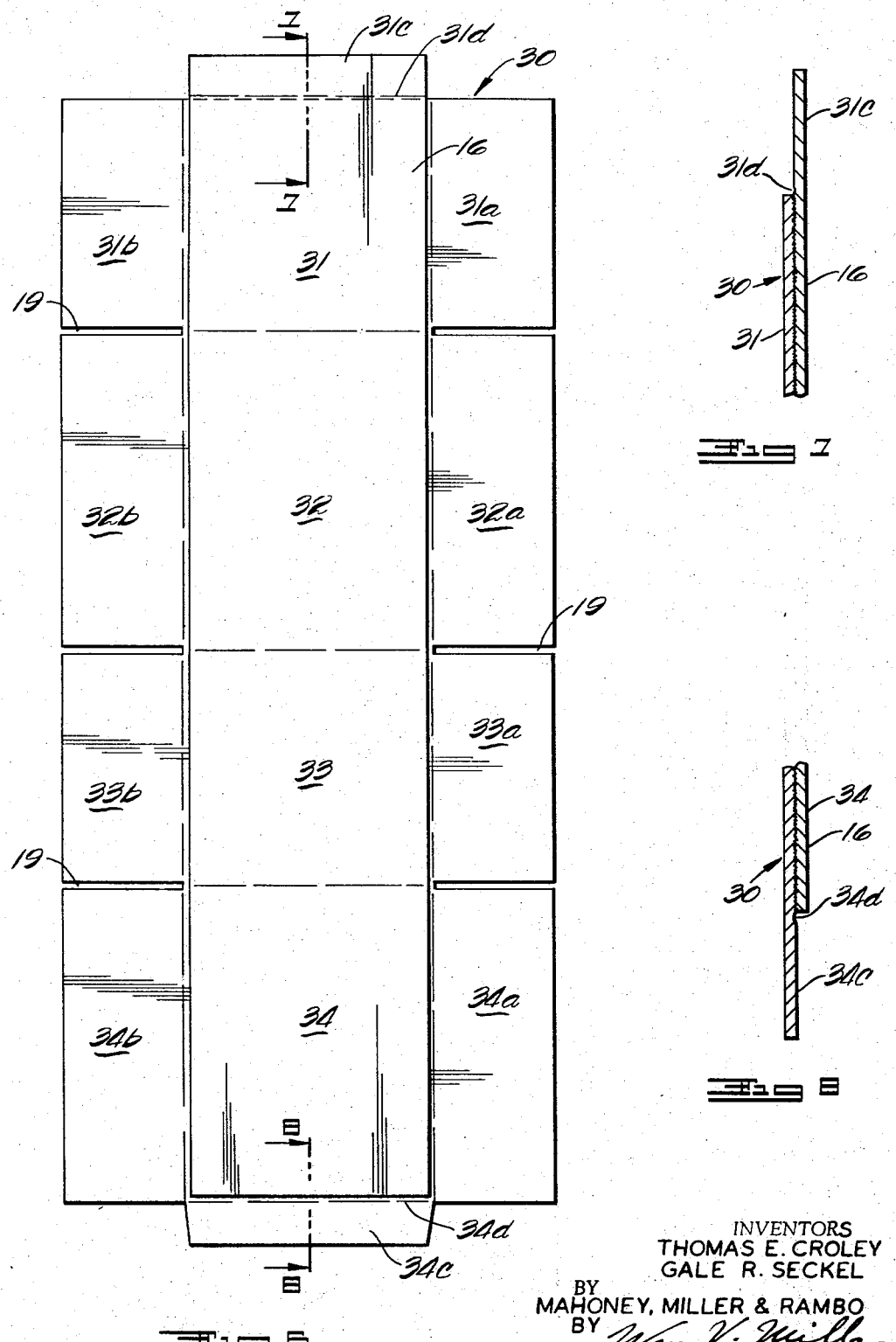

United States Patent Office 3,361,326
Patented Jan. 2, 1968

3,361,326
FIBERBOARD BOX HAVING A STRENGTHED CONNECTOR CORNER JOINT
Thomas E. Croley, Columbus, Ohio, and Gale R. Seckel, Huntington, W. Va., assignors to The Corrugated Container Company, Columbus, Ohio, a corporation of Ohio
Filed Mar. 1, 1966, Ser. No. 530,907
1 Claim. (Cl. 229—37)

ABSTRACT OF THE DISCLOSURE

A box made of suitable sheet material such as corrugated fiberboard, solid fiberboard, paperboard, or similar material from a flat blank properly slit and scored and set up in parallelepiped form usually with the final connector joint for the adjacent end extremities of the blank at one of the vertical corners of the box. This connector corner is of novel form and is designed to provide increased strength to prevent failure at the corner.

---

The connector joint for the ends of the blank in a set-up box of this general type usually has an attaching or connecting flap or flange connected at a corner fold line to the one vertical wall and extending in flat overlapping relationship to the other vertical wall, generally disposed at a right angle to the first wall, to which it is usually fastened by means of adhesive or in another suitable manner. There is a tendency for this type of connector joint to give way under load by tearing or slitting at the corner fold line, especially if the box is large and filled with granular or small particle bulk material which tends to cause bulging of the walls of the box and apply excessive forces to the corners. We have improved this connector corner by duplicating the attaching or connecting flap on the other vertical wall so that it will extend in an opposite direction and at a right angle to the first flap, into flat overlapping relationship to the first flap-carrying wall and can be secured thereto in a similar manner. The result is that there is a stronger corner provided since there will be two connector flaps secured to the respective cooperating vertical walls which will produce a double overlapping corner fold. Consequently, even if one of the corner folds gives away, the other will still serve to connect the two meeting angularly disposed walls of the box. Thus, there is double assurance against failure of the connector corner of the box.

In the accompanying drawings, we have illustrated examples of boxes embodying our improved connector corner joint but it is to be understood that they are for purpose of illustration and not limitation.

In these drawings:

FIGURE 1 is a perspective view of a box showing the improved connector corner joint.

FIGURE 2 is a horizontal sectional view taken along line 2—2 of FIGURE 1.

FIGURE 3 is a plan view of a blank used in forming the box of FIGURES 1 and 2.

FIGURE 4 is a perspective view, partly cut away, showing the improved connector corner of a box which has a double wall thickness arrangement.

FIGURE 5 is a horizontal sectional view taken along line 5—5 of FIGURE 4.

FIGURE 6 is a plan view of a blank used in forming the box of FIGURES 4 and 5.

FIGURE 7 is an enlarged transverse sectional view taken along line 7—7 of FIGURE 6.

FIGURE 8 is an enlarged transverse sectional view taken along lines 8—8 of FIGURE 6.

With reference to the drawings, a box 10 is indicated in FIGURE 1 and is of suitable parallelepiped form as set-up with a connector corner indicated generally at 11. This corner is shown as being one of the vertical corners but could be located otherwise. It is that corner where the ends of the box blank come together when the box is set up and where the blank ends are attached to retain the blank in set-up condition.

This particular box is made from a one-piece blank 20 shown in FIGURE 3 which may be of suitable fibrous sheet material such as corrugated fiberboard, solid fiberboard, paperboard, cardboard or similar material. The blank is of one-piece and is suitably scored and slit to provide the walls 21, 22, 23, and 24, which will be the vertical walls of the box 10 when the blank 20 is set up and which are hinged together along the score lines or hinge joints indicated by the broken lines in this figure. These walls will have the upper closure flaps 21a, 22a, 23a, and 24a, hinged respectively thereto at the indicated score lines and the lower closure flaps 21b, 22b, 23b, and 24b, hinged respectively thereto at the indicated score lines. The various closure flaps are separated from each other at the slits 12.

Each of the end extremities of the blank 20 outwardly of the walls 21 and 24 is provided with an attaching or connector flap or flange indicated respectively by the numerals 21c and 24c, hinged at the indicated score lines 21d and 24d to the respective walls.

When the box 10 is set up to the condition shown in FIGURES 1 and 2, the blank 20 is folded along the fold lines between the walls 21, 22, 23 and 24, which are vertically disposed, and along the fold or hinge lines 21d and 24d of the respective connector flaps or flanges 21c and 24c. The walls 21 and 24 are disposed in right angular relationship, as shown in FIGURE 2, and the flange 21c is disposed at a right angle to the wall 21, which carries it, and with its outer face in flat contact with the inner face of the other wall 24 to which it may be attached by a suitable adhesive. Similarly, the flange 24c is disposed at a right angle to the wall 24, which carries it, and with its inner face in flat contact with the outer face of the other wall 21 to which it may be attached by a suitable adhesive.

This arrangement disposes the flanges 21c and 24c at the corner 11 at a right angle to each other and each extending outwardly from its corner fold, with the flange carried by one wall in flat contact with and overlapping the one surface of the second wall and with the flange carried by the second wall in flat contact with and overlapping the opposite surface of the first wall. This also provides a double thickness corner fold joint formed by the inner fold 21d and the outer fold 24d. Thus, if one corner fold rips or tears under pressure, the other corner fold will retain the walls 21 and 24 in connected right angular relationship. Furthermore, each flange 21c and 24c will reinforce the other wall, which it overlaps and is in face contact and to which it is attached, throughout its vertical extent to prevent excessive distortion of the wall itself which would tend to rupture the associated corner fold after repeated bendings.

The box 15 of FIGURES 4 and 5 is similar to the box 10 of FIGURES 1 and 2 except that the side walls are of double thickness which results from the use of a liner indicated at 16. This liner 16 is applied as a strip or lamination to the blank 30, as shown in FIGURE 6. The box set up from that blank has the vertical walls 31, 32, 33, and 34 of double thickness. On the upper edges of the respective walls 31, 32, 33 and 34, the hinged top closure flaps 31a, 32a, 33a, and 34a are provided and on the lower edges of these respective walls, the hinged bottom closure flaps 31b, 32b, 33b, and 34b are provided. The connector corner 17 is similar to the corner 11 of FIGURE 1 in that it also provides a double corner joint.

The blank 30 of FIGURE 6 is made identical with the blank 20 of FIGURE 3 but has only one attaching or connector flange or flap 34c (FIGURE 8) which is hinged at one end along a fold line 34d, the other end of the blank itself being free of a flange. However, the other end of the liner strip 16 has the attaching or connector flange 31c (FIGURE 7) formed thereon and which is hinged to the body of the liner strip along the fold line 31d, this line being outwardly slightly of the adjacent end extremity of the blank 30. The other end of the liner strip 16 terminates just short of the fold line 34d. The liner strip 16 is in flat contact with the inner face of the blank 30 and may be secured thereto by adhesive throughout its length. The line 16 is provided with transverse fold lines corresponding to those in the underlying blank 30 which align with the slits 19 between the various closure flaps.

When the box 15 is set up as indicated in FIGURES 4 and 5 and as previously described, the corner 17 will be a double thickness corner of improved strength. The blank is set up to form the double vertical walls 31, 32, 33 and 34 by bending it along the fold lines therebetween and along the fold or hinge lines 31d and 34d of the respective connector flaps or flanges 31c and 34c. The double walls 31 and 34 are disposed in right angular relationship, as shown in FIGURE 5, and the flange 31c on the liner 16 is disposed at a right angle to the double wall 31, which carries it, and with its outer face in face contact with the inner face of the liner 16 carried at the other double wall 34 and these faces may be attached by a suitable adhesive. Similarly, the flange 34c on the main blank 30 is disposed at a right angle to the double wall 34, which carries it, and with its inner face in flat contact with the outer face of the other double wall 31 and these faces may be attached by a suitable adhesive.

The corner arrangement in this double wall box construction also disposes the flanges 31c and 34c at the corner 17 at a right angle to each other and each extending outwardly from its corner fold, with the flange carried by the one double wall in face contact and overlapping the one surface of the second double wall and with the flange carried by the second wall in face contact and overlapping the opposite surface of the first wall. This also provides a double thickness corner fold joint by the inner fold 31d and the outer fold 34d, providing a corner connection even if one of the corner folds does rip or tear. Also, the flanges 31c and 34c which overlap the respective double walls, and are secured to adjacent face surfaces thereof, will provide additional reinforcement for these walls adjacent the corner folds thereof. It will be noted from FIGURE 5 that in this instance the flange 31c is offset inwardly from its associated inner fold 31d to receive the adjacent end of the liner strip 16 so that it will lie in flat contact therewith.

It will be apparent that this invention provides a box structure, either with a single wall or a laminated wall structure, which has a strengthened connector corner joint. Some of the advantages of this corner joint have been discussed and others will be apparent.

Having thus described this invention, what is claimed is:

1. A box structure comprising a wall-forming blank of material of suitable wall thickness scored to provide a series of walls integrally connected together at hinged corner joints which are spaced successively longitudinally of the blank and having free ends adapted to be connected together at a corner with two of the resulting walls at said ends disposed in angular relationship, means for connecting said walls together at said corner, said means comprising relatively angularly disposed attaching flanges carried integrally by the respective walls at said corner to which they are connected by corner folds being of substantially the same thickness as said walls and extending outwardly from said folds, the attaching flange carried by one wall being in face contact with and overlapping the one surface of the second wall and the attaching flange carried by the second wall being in face contact with and overlapping the opposite surface of the first wall, and means for securing the contacting flanges and walls together, the attaching flange on the one wall being disposed inside the second wall and the attaching flange on the second wall being disposed outside the first wall, said walls being of double laminated structure comprising an inner liner lamination and an outer main lamination, the attaching flange on the first wall being an extension of the inner lamination and the attaching flange on the second wall being an extension in the opposite direction of the outer lamination, said liner lamination terminating at one end of the main lamination inwardly of the corner fold of the attaching flange formed thereon to provide an inwardly opening space between said fold and said liner end, said liner lamination extending beyond the other end of the main lamination and having the other attaching flange formed thereon in inwardly offset position so that it will lie in flat contact with the adjacent inner surface of said first end of the lamination with its adjacent corner fold positioned in said space.

References Cited

UNITED STATES PATENTS

| | | | |
|---|---|---|---|
| 371,230 | 10/1887 | Trum | 229—37 |
| 1,861,206 | 5/1932 | Burgess | 229—37 |
| 2,085,465 | 6/1937 | Hultin | 229—37 |
| 2,279,233 | 4/1942 | Groves | 229—37 |
| 2,792,166 | 5/1957 | Brooks | 229—23 |
| 3,072,314 | 1/1963 | Keene | 229—23 |
| 3,099,379 | 7/1963 | Stease | 229—23 |
| 3,245,604 | 4/1966 | Chapman | 229—48 |
| 3,275,217 | 4/1966 | Dornbush et al. | 229—37 |

DAVIS T. MOORHEAD, *Primary Examiner.*